(12) United States Patent
Solihin

(10) Patent No.: US 10,956,331 B2
(45) Date of Patent: Mar. 23, 2021

(54) CACHE PARTITIONING IN A MULTICORE PROCESSOR

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 131 days.

(21) Appl. No.: 16/448,239

(22) Filed: Jun. 21, 2019

(65) Prior Publication Data

US 2019/0370175 A1 Dec. 5, 2019

Related U.S. Application Data

(60) Division of application No. 15/474,577, filed on Mar. 30, 2017, now Pat. No. 10,346,308, which is a (Continued)

(51) Int. Cl.
*G06F 12/08* (2016.01)
*G06F 12/0842* (2016.01)
(Continued)

(52) U.S. Cl.
CPC ............ *G06F 12/0842* (2013.01); *G06F 1/32* (2013.01); *G06F 12/08* (2013.01); *G06F 12/0848* (2013.01); *G06F 12/0875* (2013.01); *G06F 12/126* (2013.01); *G06F 12/128* (2013.01); *G06F 15/17381* (2013.01); *G06F 15/781* (2013.01); *G06F 9/5077* (2013.01); *G06F 12/12* (2013.01); *G06F 2212/282* (2013.01); *G06F 2212/452* (2013.01); *G06F 2212/6012* (2013.01); *Y02D 10/00* (2018.01)

(58) Field of Classification Search
CPC ............ G06F 12/0842; G06F 12/0848; G06F 12/0857; G06F 12/0871; G06F 12/0875; G06F 2212/452; G06F 2212/601; G06F 2212/6012; G06F 2212/6042; G06F 2212/6046
USPC .......................................... 711/129, 133, 134
See application file for complete search history.

(56) References Cited

U.S. PATENT DOCUMENTS

| 4,463,424 A | 7/1984 | Mattson et al. |
| 5,537,635 A | 7/1996 | Douglas |

(Continued)

FOREIGN PATENT DOCUMENTS

CN  103077128  5/2013

OTHER PUBLICATIONS

Albert Wu, "The Future of Miceroprocessors", Intel Corporation, IEEE Micro, Dec. 1996, 46-53.

(Continued)

*Primary Examiner* — Gary J Portka

(57) ABSTRACT

Techniques described herein generally include methods and systems related to cache partitioning in a chip multiprocessor. Cache-partitioning for a single thread or application between multiple data sources improves energy or latency efficiency of a chip multiprocessor by exploiting variations in energy cost and latency cost of the multiple data sources. Partition sizes for each data source may be selected using an optimization algorithm that minimizes or otherwise reduces latencies or energy consumption associated with cache misses.

18 Claims, 6 Drawing Sheets

Related U.S. Application Data continuation of application No. 14/363,792, filed as application No. PCT/US2013/057177 on Aug. 29, 2013, now Pat. No. 9,612,961.

(51) Int. Cl.

| | |
|---|---|
| *G06F 1/32* | (2019.01) |
| *G06F 12/126* | (2016.01) |
| *G06F 15/173* | (2006.01) |
| *G06F 12/0875* | (2016.01) |
| *G06F 12/0846* | (2016.01) |
| *G06F 12/128* | (2016.01) |
| *G06F 15/78* | (2006.01) |
| *G06F 9/50* | (2006.01) |
| *G06F 12/12* | (2016.01) |

(56) References Cited

U.S. PATENT DOCUMENTS

| | | | |
|---|---|---|---|
| 6,865,647 | B2 | 3/2005 | Olarig et al. |
| 9,645,945 | B2 | 5/2017 | Meredith |
| 9,984,004 | B1* | 5/2018 | Little ................. G06F 12/0811 |
| 2009/0138658 | A1 | 5/2009 | Dreslinski, Jr. et al. |
| 2011/0283124 | A1 | 11/2011 | Branover et al. |
| 2012/0042131 | A1 | 2/2012 | Flemming et al. |
| 2012/0173907 | A1 | 7/2012 | Moses et al. |

OTHER PUBLICATIONS

WIPO, Written Opinion for International Patent Application No. PCT/US2013/057177, dated Oct. 13, 2013, 8 Pages.

WIPO, International Search Report for International Patent Application No. PCT/US2013/057177, dated Oct. 18, 2013, 4 Pages.

Borkar, et al., "The Future of Microprocessors", Communication of the ACM, vol. 54, No. 5, May 1, 2006, pp. 67-77.

Borkar, et al., "The Future of Microprocessors", Communication of the ACM, vol. 54, No. 5, May 2011, 67-77 Pages.

WIPO, International Preliminary Report on Patentability for International Patent Application No. PCT/US2013/057177, dated Mar. 1, 2016, 9 Pages.

Kim, et al., "Fair Cache Sharing and Partitioning in a Chip Multiprocessor Architecture", in the Proceedings of the 13th International Conference on Parallel Architectures and Compilation Techniques (PACT), Sep. 29, 2004, pp. 111-122.

Oskin, et al., "Laying a New Foundation for It: Computer Architecture for 2025 and Beyond", Workshop on Advancing Computer Architecture Research (ACAR-II), in Seattle, Sep. 20-21, 2010, pp. 1-29.

Qureshi, et al., "Utility-Based Cache Partitioning: A Low-Overhead, High-Performance, Runtime Mechanism to Partition Shared Caches", The 39th Annual IEEE/ACM International Symposium on Microarchitecture, Dec. 9-13, 2006, pp. 423-432.

Ranganathan, et al., "Reconfigurable Caches and their Application to Media Processing", Proceedings of the 27th International Symposium on Computer Architecture (ISCA-27), Jun. 14, 2000, pp. 214-224.

Sundararajan, et al., "Cooperative Partitioning: Energy-Efficient Cache Partitioning for High-Performance CMPs", IEEE 18th International Symposium on High Performance Computer Architecture (HPCA), Feb. 25-29, 2012, 12 Pages.

Tam, et al., "Managing Shared L2 Caches on Multicore Systems in Software", Appeared in the International Workshop on the Interaction between Operating Systems and Computer Architecture, held in Junction with ISCA-34, San Diego, USA, Jun. 2007, 8 Pages.

Wang, et al., "Dynamic Cache Reconfiguration and Partitioning for Energy Optimization in Real-Time Multicore Systems", ACM, San Diego, USA, Jun. 5-10, 2011, 6 pages.

Yu, "The Future of Microprocessors", IEEE Micro, Dec. 1996, pp. 46-53.

* cited by examiner

CACHE PARTITIONING IN A MULTICORE PROCESSOR

CROSS REFERENCE TO RELATED APPLICATIONS

The present application is a divisional application under 35 U.S.C. § 121 of and claims priority under 35 U.S.C. § 120 to U.S. patent application Ser. No. 15/474,577, filed on Mar. 30, 2017, entitled "CACHE PARTITIONING IN A MULTICORE PROCESSOR," now U.S. Pat. No. 10,346,308, which in turn is a continuation application under 35 U.S.C. § 120 of U.S. patent application Ser. No. 14/363,792, filed on Jun. 7, 2014, entitled "CACHE PARTITIONING IN A MULTICORE PROCESSOR," now U.S. Pat. No. 9,612,961, which in turn is a U.S. National Stage filing under 35 U.S.C. § 371 of International Patent Application No. PCT/US2013/057177, filed on Aug. 29, 2013, entitled "CACHE PARTITIONING IN A MULTICORE PROCESSOR." U.S. patent application Ser. No. 15/474,577, U.S. patent application Ser. No. 14/363,792, and International Patent Application No. PCT/US2013/057177, including any appendices or attachments thereof, are hereby incorporated by reference in their entirety.

BACKGROUND

Unless otherwise indicated herein, the approaches described in this section are not prior art to the claims in this application and are not admitted to be prior art by inclusion in this section.

In keeping with Moore's Law, the number of transistors that can be practicably incorporated into an integrated circuit has doubled approximately every two years. This trend has continued for more than half a century and is expected to continue in the foreseeable future. However, simply adding more transistors to a single-threaded processor no longer produces a significantly faster processor. Instead, increased system performance has been attained by integrating multiple processor cores on a single chip to create a chip multiprocessor, and sharing processes between the multiple processor cores of the chip multiprocessor. System performance and power usage can be further enhanced with chip multiprocessors that have core elements configured for multiple instruction sets or for handling different subsets of instruction sets or execution threads.

SUMMARY

In accordance with at least some embodiments of the present disclosure, a method of updating a cache in a multi-core processor comprises receiving a notification of a cache miss associated with a process or thread running on a single core of the multi-core processor, the multi-core processor including a first cache partition for storing data from a first data source and a second cache partition for storing data from a second data source, determining that an address associated with the cache miss corresponds to the first data source, and storing data associated with the cache miss in the first cache partition.

In accordance with at least some embodiments of the present disclosure, a multi-core processor comprises a first cache partition for storing data from a first data source and a second cache partition for storing data from a second data source and a controller. The controller is configured to receive a cache miss associated with a process running on a single core of the multi-core processor, determine that an address associated with the cache miss corresponds to the first data source, and store data associated with the cache miss in the first cache partition.

In accordance with at least some embodiments of the present disclosure, a non-transitory computer readable storage medium comprises computer-executable instructions. The instructions, when carried out by a computer, cause the computer to carry out the steps of receiving notification of a cache miss associated with a process running on a single core of the multi-core processor, determining that an address associated with the cache miss corresponds to the first data source, and storing data associated with the cache miss in the first cache partition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

Figure 1:
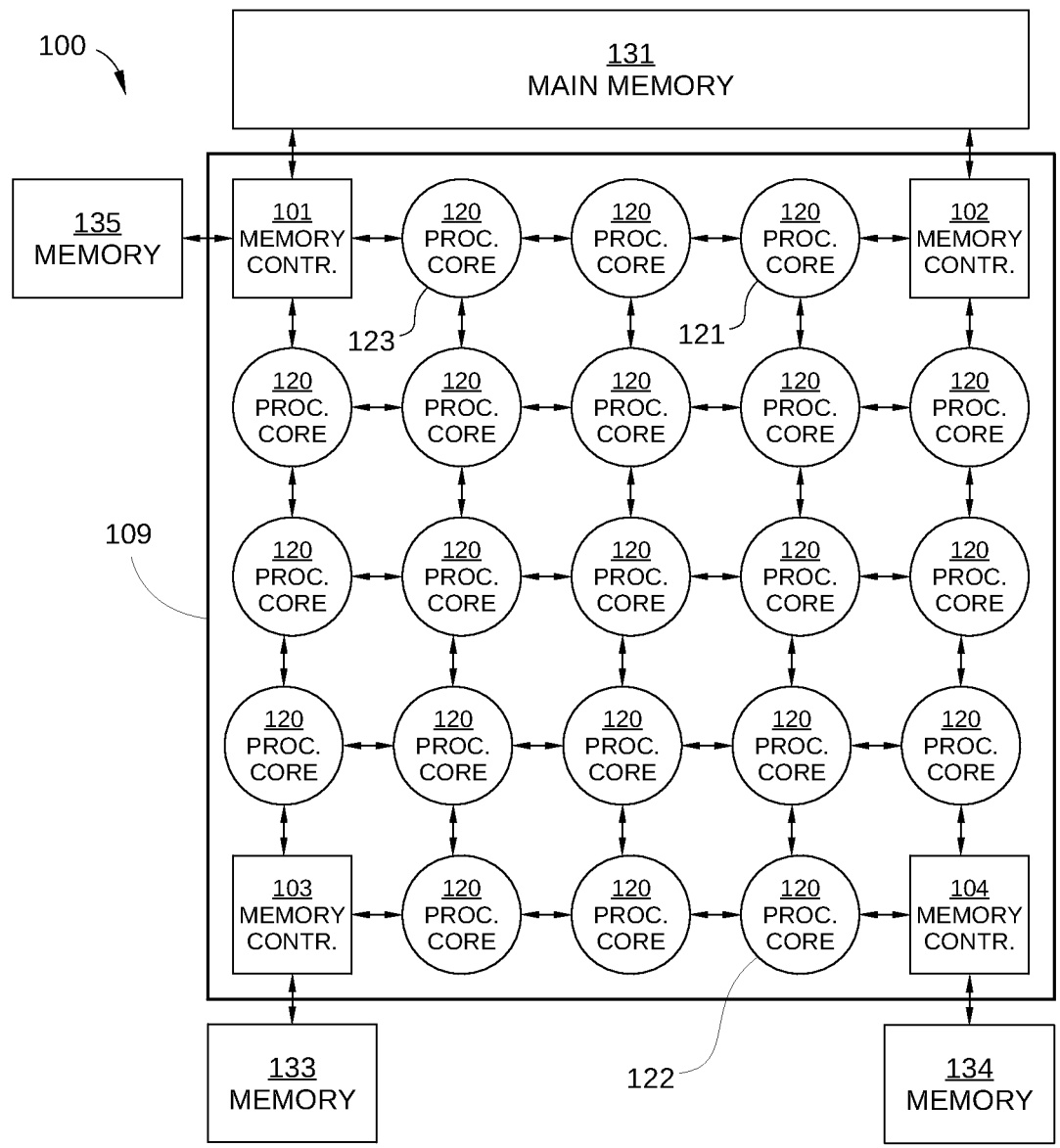
FIG. 1 shows a block diagram of an example embodiment of a chip multiprocessor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the disclosure, as generally described herein, and illustrated in the Figures, can be arranged, substituted, combined, and designed in a wide variety of different configurations, all of which are explicitly contemplated and make part of this disclosure.

There is a trend toward large-scale chip multiprocessors that include a relatively large number of processor cores, with core counts as high as hundreds or thousands envisioned in the near future. Such processors can greatly reduce processing time for applications that have high levels of concurrency, e.g., applications in which multiple computations can be executed simultaneously or in parallel with each other. However, as this trend continues, efficient use of all processor cores in high core-count chip multiprocessors may become more difficult, since threshold voltage can no longer be scaled down without exponentially increasing the static power consumption incurred due to leakage current in the chip multiprocessor. As a result, the power budget available per core in high core-count chip multiprocessors may decrease in each future technology generation. This situation results in a phenomenon referred to as the "power wall," "utility wall," or "dark silicon," where an increasing fraction of a high core-count chip multiprocessor may not be powered at full frequency or powered on at all. Thus, performance improvements in such chip multiprocessors may be strongly contingent on energy efficiency, such as performance/watt or operations/joule.

In light of the above, a possible avenue in improving energy efficiency in chip multiprocessors is the technique of near threshold-voltage design (NTD), which lowers the supply voltage close to the threshold voltage for cores in a chip multiprocessor. Because dynamic power consumed by a core may be proportional to $CV^2f$, where C=capacitance, V=supply voltage, and f=clock frequency, lowering supply voltage (and consequently also frequency) for a core may have a cubic impact in lowering dynamic power consumed by the core. In comparison, the corresponding decrease in performance of the core that results from the lowering of supply voltage, e.g., the decrease in frequency, may be linear. Thus, NTD could be an attractive approach for increasing energy efficiency of chip multiprocessors.

According to embodiments of the present disclosure, systems and methods of cache-partitioning are used to improve energy efficiency in a chip multiprocessor using NTD. Specifically, a cache is split into cache partitions for a single thread or application, where each partition stores data from a particular data source to improve energy or latency efficiency of a chip multiprocessor by exploiting variations in energy cost and latency cost of fetching data from the multiple data sources. For example, when energy efficiency is important in processing a particular thread or application with a specific core, cache partitions may be allocated to store data from available data sources, and the sizes of the partitions may be modulated to achieve optimum or otherwise improved energy efficiency. Similarly, when maximum performance, e.g., minimum latency, is important in processing a thread or application, cache partitions may be allocated for storing data from available data sources and sized to achieve optimum or otherwise improved performance.

The impact of NTD on the memory controllers of a chip multiprocessor may be likely small in a scenario where application programs are more latency-bound than bandwidth-bound (e.g., applications that may be delay-critical). For example, lowering the clock frequency of a memory controller by half may result in doubling the latency thereof from approximately 10 clock cycles to 20 clock cycles, which is negligible compared to a cache miss latency that is already on the order of 200-300 clock cycles. Therefore, there are numerous applications whose performance may not be affected significantly when NTD is applied to memory controllers.

FIG. 1 shows a block diagram of an example embodiment of a chip multiprocessor (CMP) 100, arranged in accordance with at least some embodiments of the present disclosure. CMP 100 may be a multi-core processor formed from a single integrated circuit die 109, and can be configured to carry out parallel processing tasks (e.g., processing multiple threads) using multiple processor cores formed on integrated circuit die 109. CMP 100 may generally include multiple memory controllers and processor cores configured for near-threshold operation and arranged in a tiled array. The tiles, such as memory controllers 101-104 and processor cores 120, may be coupled together using any technically feasible interconnect topology, such as the two-dimensional mesh shown in FIG. 1. Thus, CMP 100 may include 21 processor cores 120, each configured with a suitable router, and four memory controllers 101-104.

For clarity and brevity, additional shared resources that may be present on integrated circuit die 109, such as I/O ports, bus interfaces, a power management unit, and the like, are omitted from FIG. 1. In addition, any technically feasible combination of memory controllers and processor cores may be used in a chip multiprocessor without exceeding the scope of the disclosure. Furthermore, CMP 100 may be coupled to or include a task manager, a system clock, an operating system (OS), and/or other component(s).

Each of processor cores 120 may be any technically feasible processor or processor core suitable for formation on integrated circuit die 109. Generally, some or all of processor cores 120 may be configured to process one or multiple applications or execution threads of an application. In some embodiments, some or all of processor cores 120 may be substantially identical in configuration, and in other embodiments, processor cores 120 may include varying processor core configurations, such as configurations specialized for certain applications, e.g., graphics processing units, etc. In addition, in some embodiments, some or all of processor cores 120 may include a cache for an instruction buffer and a data buffer, sometimes referred to "L1 cache (instruction or data)," and, in some instances, an L2 cache. When a processor core 120 experiences a cache miss, i.e., when an attempt to read or write a piece of data in the cache fails, the processor core 120 may access one of data sources 1-5, which are described below.

Each of memory controllers 101-104 may be digital circuits configured to manage the flow of data between CMP 100 and memory external to CMP 100. Because CMP 100 configured for near-threshold operation in some embodiments, memory controllers 101-104 may operate at different clock frequencies. For example, in the embodiment illustrated in FIG. 1, memory controller 101 may operate at a memory controller base clock frequency, f, memory controller 102 may operate at half the memory controller base clock frequency, f/2, and memory controllers 103 and 104 may operate at one quarter the memory controller base clock frequency, f/4. Furthermore, each of memory controllers 101-104 may be associated with one or more data sources, where a data source may be a combination of a memory controller and a specific memory that may be accessed by processor cores 120 in the event of a cache miss by one of processor cores 120. For example, in the embodiment illustrated in FIG. 1, the combination of memory controller 101 and main memory 131 may be referred to herein as data source 1; the combination of memory controller 102 and main memory 131 may be referred to herein as data source 2; the combination of memory controller 103 and memory 133 may be referred to herein as data source 3; the combination of memory controller 104 and memory 134 may be referred to herein as data source 4; and the combination of memory controller 101 and on-die memory 135 may be referred to herein as data source 5.

Each of data sources 101-105, may have a different latency cost and/or energy cost associated therewith. Specifically, when employed by a processor core 120 as a "cache miss source," e.g., a data source for satisfying a cache miss experienced by the processor core 120, each of data sources 101-105 may require more or less time and/or energy to satisfy the cache miss. For example, assuming that memory controller base clock frequency f is one quarter of the processor clock frequency and that each memory controller has five pipeline stages, then the latency for servicing a memory request is 20 processor clock cycles for memory controller 101, 40 cycles for memory controller 103, and 80 cycles for memory controllers 102 and 104.

Another factor contributing to the different respective latency costs associated with each of data source 101-105 may be the access latency attributed to the memory included in each of data sources 101-105. For example, main memory 131 may be, for example, an off-chip dynamic random access memory (DRAM) memory having a relatively long access latency on the order of hundreds of processor clock cycles, whereas on-die memory 135 may be, for example, an on-chip DRAM having a much shorter access latency. Thus, while data source 1 and data source 5 may both include the same memory controller 101, data source 1, in this example, can have a significantly greater total latency associated therewith than data source 5, since the access latency of main memory 131 in data source 1 may be an order of magnitude greater than the access latency of on-die memory 135 in data source 5.

Furthermore, the location of each of data sources 1-5 relative to the specific processor core 120 accessing the data source may significantly affect latency cost when servicing a memory request from the specific processor core 120. For example, assuming that each router in CMP 100 is a four-stage pipeline, then the time to route a packet over one router and link, e.g., one "hop," may be 10 processor clock cycles round trip. Thus, when processor core 121 employs data source 1 to satisfy a cache miss in the cache of processor core 121, 20 processor clock cycles may be added to the latency associated with data source 1, and when processor core 121 employs data source 4 to satisfy the cache miss, 60 processor clock cycles may be added to the latency associated with data source 4.

As such, it is evident that when NTD is applied to memory controllers in CMP 100, latency and energy costs for satisfying a cache miss experienced by a processor core 120 can vary significantly. This is because the latency and energy costs may depend on the operating frequency of each memory controller in data sources 1-5, the respective latency costs associated with each of data source 1-5, the location of each of data sources 1-5 relative to the specific processor core 120 experiencing the cache miss, and/or other factors. For example, when processor core 121 suffers a cache miss while running an application, the latency to satisfy the cache miss may be 40 processor clock cycles if data source 1 is used to handle the cache miss: (2 hops×10 cycles/hop)+20 cycles of memory controller latency for memory controller 1. In comparison, the latency to satisfy the cache miss may be 100 processor clock cycles if data source 2 is used to handle the cache miss: (2 hops×10 cycles/hop)+80 cycles of memory controller latency for memory controller 2. Thus, there may be a significant difference in latency depending on how a cache miss is processed. Even if off-chip access latency is included, for example 150 processor clock cycles for both memory controller 101 and memory controller 102 to access main memory 131, total cache miss latency, e.g., the latency costs of using data source 1 and 2 may be significantly different: using data source 1 is 190 processor clock cycles (40+150) compared with 230 processor clock cycles (80+150) when using data source 2.

In another example, energy costs can vary greatly in CMP 100, depending on how a cache miss is processed. When processor core 122 suffers a cache miss while running an application, the latency to satisfy the cache miss may be 90 processor clock cycles if data source 4 is used to handle the cache miss: (1 hop×10 cycles/hop)+80 cycles of memory controller latency for memory controller 4. Similarly, the latency to satisfy the cache miss may be 90 processor clock cycles if data source 1 is used to handle the cache miss: (7 hops×10 cycles/hop)+20 cycles of memory controller latency for memory controller 4, so the latency associated with using data source 1 or data source 4 may be approximately the same. However, cache misses routed to data source 1 may use much more interconnect energy and a much higher memory controller power. Thus, in terms of latency cost, data source 1 and data source 4 may be substantially the same for processor core 122, but in terms of energy cost, data source 1 and data source 4 may be very different.

In light of the above, embodiments of the disclosure partition cache memory in such a way as to optimize or otherwise improve the performance or energy efficiency of a processor core 120 in CMP 100 that is running an execution thread or application. This may be accomplished by allocating cache partitions for a processor core between data sources 1-5 and by modulating the size of said partitions to achieve the improved performance or energy efficiency. In some embodiments, a cost function for each of data sources 1-5 may be used for optimizing or otherwise improving the size of the cache partitions, with the cost function quantifying either latency cost associated with satisfying a cache miss or energy cost associated with satisfying the cache miss. Multiplying the cost functions of each of data sources 1-5 with a miss rate curve for a thread or application being run by the processor core 120 yields a miss cost curve for each data source. These miss cost curves may be used in an optimization algorithm to select partition sizes for each of data sources 1-5 that minimize or otherwise reduce the total cost of cache misses in terms of either latency or energy. The miss rate curve, the cost function, and the miss cost curve are described below in conjunction with FIGS. 2A-2C.

Figure 2C:
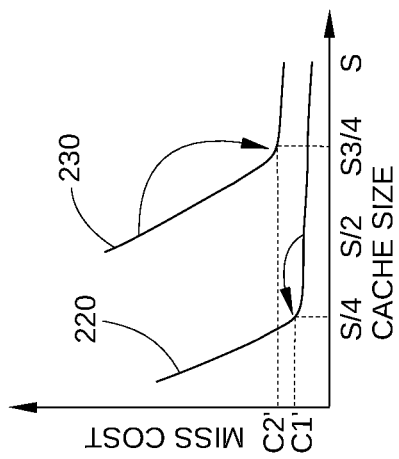
FIGS. 2B and 2C illustrate an example miss cost curve for a first data source in a chip multiprocessor and an example miss cost curve for a second data source associated with the chip multiprocessor.
Figure 2B:
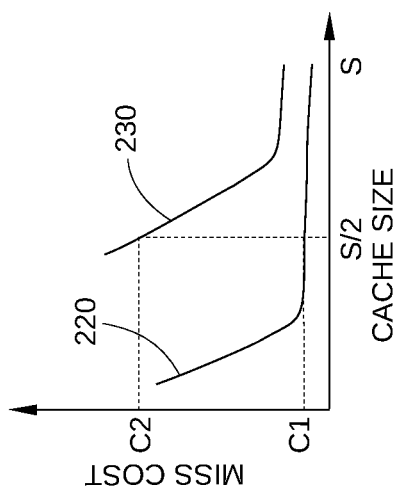
Figure 2A:
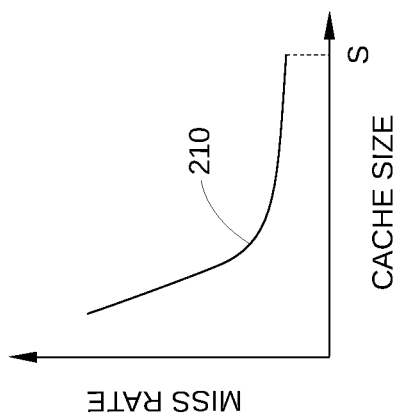
FIG. 2A shows an example miss rate curve of an application or execution thread running on one of the processor cores of the chip multiprocessor illustrated in FIG. 1.

FIG. 2A shows an example miss rate curve 210 of an application or execution thread running on one of processor cores 120 of CMP 100. Generally, miss rate curves may capture the miss rate as a function of cache memory size for a process or application running on a processor, and may be used for facilitating the partitioning of a cache memory that is shared among multiple processor cores in a chip multiprocessor. In FIG. 2A, miss rate curve 210 illustrates that the miss rate (y-axis) of an application or thread running on one of processor cores 120 may be a function of cache size (S). In other words, the miss rate may decline as cache size S increases along the x-axis. As shown, the rate of decline of miss rate curve 210, e.g., the slope of miss rate curve 210, may also diminish as cache size S increases, since more of the working set of the application or thread can be held in cache for larger values of S.

Techniques for empirically constructing a miss rate curve for a particular application or thread, such as miss rate curve 210, may be performed online or offline. Miss rate curve 210 may be generated offline by running the target application or thread multiple times, each time using a different cache memory size. Alternatively or additionally, miss rate curve 210 for the target application may be captured online using ghost buffers or other specialized hardware support.

According to embodiments of the disclosure, a cost function for each of data sources 1-5 may be used to quantify a latency cost or an energy cost to satisfy a cache miss experienced by the processor core 120 running the application. When optimizing or otherwise improving for performance, the cost function for each of data sources 1-5 may express the time to satisfy a cache miss, and, when optimizing or otherwise improving for energy efficiency, the cost function for each of data sources 1-5 may express the energy consumed by CMP 100 to satisfy the cache miss. By multiplying the cost function for one of data sources 1-5 by miss rate curve 210, a miss cost curve may be generated for the data source. Hence, a miss cost curve for a particular data source may be a function of various attributes of the data source, including but not limited to: the size S of the cache partition allocated to a particular processor core 120 in the data source; access latency associated with the memory of the data source; operating frequency of the memory controller associated with the data source; and the location of the data source relative to the processor core 120 for which the data source is partitioned.

FIGS. 2B and 2C illustrate an example miss cost curve 220 for a first data source in CMP 100 and an example miss cost curve 230 for a second data source associated with CMP 100. Each of miss cost curves 220 and 230 may be associated with a respective cache partition for one of processor cores 120. As noted above, miss cost curve 220 may be generated by constructing miss rate curve 210 (shown in FIG. 2A) and multiplying miss rate curve 210 by the cost function (latency cost or energy cost) associated with the first data source. Likewise, miss cost curve 230 may be generated by multiplying miss rate curve 210 by the cost function (latency cost or energy cost) associated with the second data source. Thus, embodiments may distinguish between the different latency/energy costs of the various data sources for CMP 100 that include memory partitions for a single thread/application running on a processor core 120. For purposes of illustration, miss cost curve 220 is assumed to be the miss cost curve associated with data source 1 for a specific application or thread running on processor core 123, and miss cost curve 230 is assumed to be the miss cost curve associated with data source 2 for said application or thread. Processor core 123, data source 1, and data source 2 are shown in FIG. 1.

As shown in FIGS. 2B and 2C, miss cost curve 220 and 230 may be different from each other, since the miss cost function for data source 1 and data source 2 may be different from each other. The miss cost function (and therefore the value of miss costs) may be generally smaller for data source 1 than for data source 2, and this may be reflected by the relative values of miss cost curve 220 and 230. For example, the memory controller of data source 1, e.g., memory controller 101, may operate at a higher frequency than the memory controller of data source 2, and may be located closer to processor core 123 than data source 2. Consequently, miss costs for data source 1 may be generally smaller than for data source 2.

Because miss costs for data source 1 may be generally smaller than for data source 2, it might be assumed that an efficient partition policy in CMP 100 would be to cache data in the lowest latency (or lowest energy-consuming) data source, e.g., data source 1, so that no misses are ever fetched from the higher latency data source, in this case data source 2. However, such an assumption may not be the best assumption, since performance (or energy efficiency) is generally determined by the aggregate cost of cache misses from various data sources, not just by the cost of any single cache miss. In other words, while caching data in the lowest latency or lowest energy-consuming data source in CMP 100 may avoid cache misses that would otherwise incur the highest latencies or higher energy costs, at some point the benefit of such a caching scheme may be generally offset by the increase in cost of servicing additional misses that arise from other data sources. This effect is illustrated in FIGS. 2B and 2C and is described below.

When a cache partitioning policy is used in CMP 100 that does not distinguish between heterogeneous data sources, such as data sources 1-5, a cache memory for a particular processor core may be generally partitioned equally between the data sources. In the case of processor core 123, which in this example uses data sources 1 and 2 for cache partitioning, data source 1 and data source 2 may each occupy roughly half the cache size: S/2. As shown in FIG. 2B, for a cache size of S/2 in data source 1, the miss cost is C1, and in data source 2 the miss cost is C2, where C2>>C1. Thus, the total miss cost for a sample population of cache misses associated with an application running on processor core 123 is C1+C2.

In comparison, FIG. 2C illustrates total miss cost for the same sample population of cache misses when an optimal (or otherwise improved) partitioning scheme, according to some embodiments, is used to determine the cache size for data source 1 and data source 2. For purposes of illustration, the optimal partitioning scheme has determined an optimal (or otherwise improved) size for a cache in data source 1 to be S/4 and in data source 2 to be ¾ S. For a cache size of S/4 in data source 1, the miss cost is C1, and for a cache size of ¾ S in data source 2, the miss cost is C2'. Thus, the total miss cost for a sample population of cache misses, when the optimal partitioning scheme is used, is C1'+C2'. As shown in FIG. 2C, (C1'+C2)<<(C1+C2). This is because, by using the optimal partitioning scheme, the partition size of data source 2 is increased to ¾ S. Such an increase in partition size of data source 2 may greatly reduce the miss cost associated with data source 2 due to miss cost curve 230 having a steep declining slope in the ½ S to ¾ S region. Furthermore, using the optimal partitioning scheme may cause the partition size of data source 1 to be decreased from S/2 to S/4, and the decrease in partition size of data source 1 may slightly increase the miss cost associated with data source 1. This is because miss cost curve 220 may not have a steep slope in the S/4 to S/2 region. Thus, the total miss cost for data sources 1 and 2, when using an optimal partitioning scheme, may be significantly less than when partitioning data sources 1 and 2 equally. One such optimal partitioning scheme, according to some embodiments, is described below.

In a chip multiprocessor, such as CMP 100, given n data sources (S1, S2, . . . , Sn) partitioned for a processor core 120 running a particular thread or application, there are n miss cost curves (MC1($s$), MC2($s$), . . . , MCn($s$)) respectively associated with each data source. Assuming that the miss cost curves MC1($s$), MC2($s$), . . . , MCn($s$) are each continuous and concave, such as miss cost curves 220 and 230, optimal (or otherwise improved) partition sizes can be determined by substantially satisfying the following conditions: 1) the partition sizes where all miss cost curves have the same or similar slope, and 2) the sum of partition sizes equals or approximately equals the total cache size S. These conditions may be summarized by Equations 1 and 2:

$$S1 + S2 + \ldots + Sn = S \quad (1)$$

$$\frac{dMC1}{ds}(S1) = \frac{dMC2}{ds}(S2) = \ldots \frac{dMCn}{ds}(Sn) = \quad (2)$$

In some embodiments, such partition sizes can be readily determined using a regular constrained optimization method. In alternative or additional embodiments, for discrete miss cost curves, the optimization can also be achieved using a regular combinatoric search algorithm similar to a bin-packing algorithm. In bin packing, objects of different weights may be packed into a finite number of bins of fixed capacity in a way that minimizes or otherwise reduces the number of bins used. In such embodiments, the bins may correspond to the n data sources S1, S2, Sn, the objects being packed may be the smallest units of cache partition size, and the weight of each object may be related to the miss cost. An objective of such an algorithm may be to minimize or otherwise reduce the total miss cost. It is noted that such an algorithm may differ from other bin-packing algorithm(s) because: 1) the number of bins (e.g., data sources) may be constant and may not be the goal of the optimization/improvement; 2) the weight of each object (e.g., the miss cost) may not be constant and may be computed by referencing the miss cost curve with the number of objects of a particular bin; and 3) a goal of the optimization/improvement may be to minimize or otherwise reduce the total cost of the misses for all bins. It is noted that a single miss rate curve may be generally constructed for optimizing or otherwise improving the partitioning for a particular processor core running a specific thread or application.

In some embodiments, the number of data sources distinguished in an optimal partitioning scheme may be fewer than the total number of data sources available to a processor core in CMP 100. For example, when multiple data sources have substantially similar latency or energy costs when employed by the processor core as cache memory, such data sources may be treated as a single data source.

Figure 3:
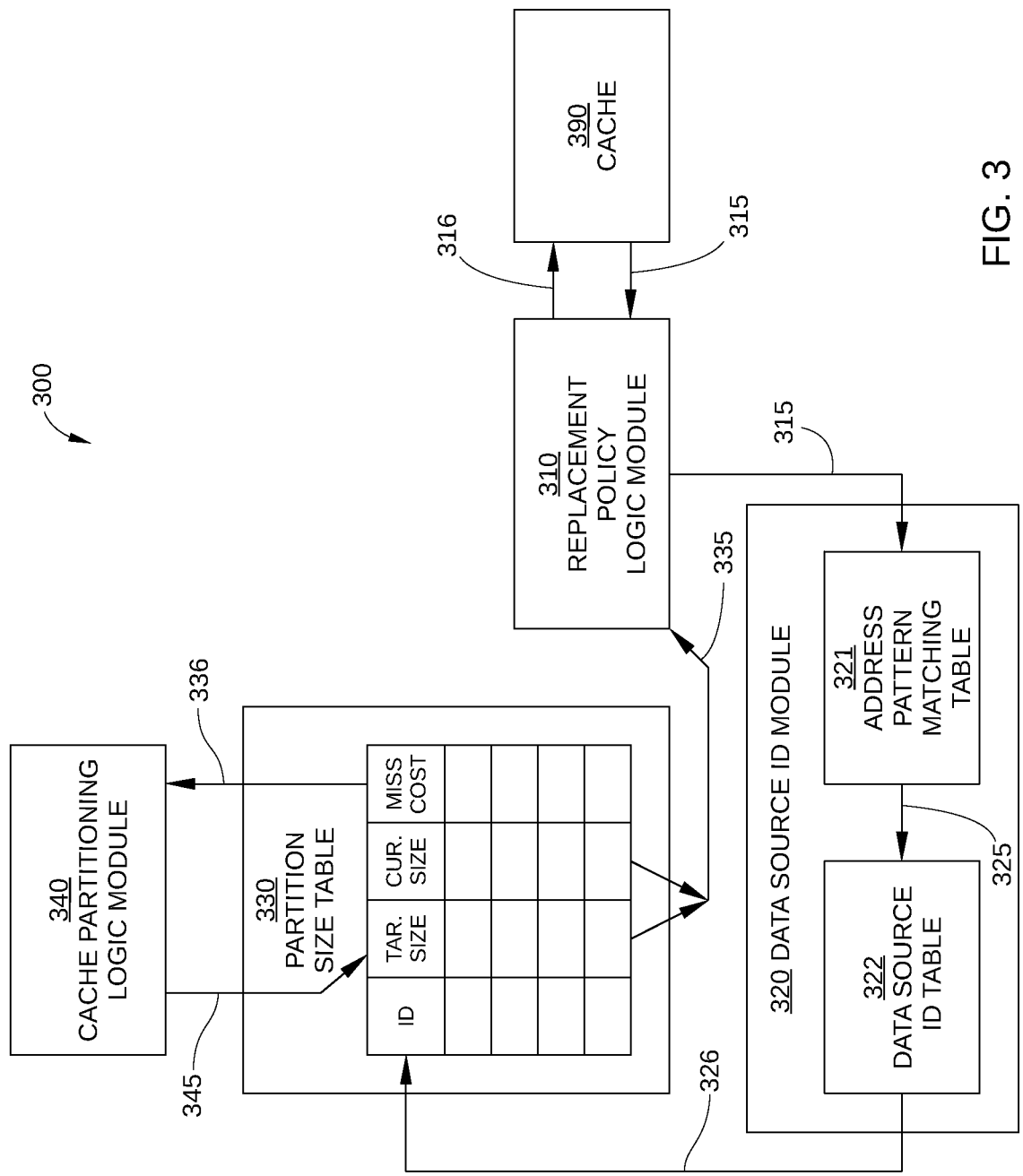
FIG. 3 is a block diagram illustrating a cache partitioning system.

FIG. 3 is a block diagram illustrating, according to one or more embodiments of the disclosure, a cache partitioning system 300. In a chip multiprocessor in which a single processor core is running an application or thread, cache partitioning system 300 may be configured to determine optimal or otherwise improved cache sizes of multiple data sources employed by the processor core. In some embodiments, cache partitioning system 300 may be further configured to dynamically re-size the cache memory partitions of the data sources based on the most current miss cost history of each data source. As shown, cache partitioning system 300 may include a replacement policy logic module 310, a data source identifier module 320, a partition size table 330, and a cache partitioning logic module 340, all operatively coupled to each other. Replacement policy logic module 310, data source identifier module 320, partition size table 330, and/or cache partitioning logic module 340 may be implemented in cache partitioning system 300 as dedicated hardware, firmware, components of an operating system associated with a host device associated with CMP 100, or a combination thereof.

Replacement policy logic module 310 may be configured to determine where to store data associated with a cache miss experienced by a processor core in a chip multiprocessor. For example, while running an application or thread, a processor core of CMP 100, such as processor core 123 (shown in FIG. 1), may experience a cache miss. That is, processor core 123 may access cache 390 and discover that data is not present in the cache 390, indicating a cache miss. Cache 390 may be an on-chip or off-chip cache for processor core 123, and may be partitioned between each of data sources 1-5 (shown in FIG. 1) according to an optimal partitioning scheme of the disclosure. Thus, when data are fetched into cache 390 by processor core 123, replacement policy logic module 310 may be configured to then determine how to store the retrieved data referenced in cache miss data 315. Specifically, replacement policy logic module 310 may receive cache miss data 315, which may include a notification of a cache miss being experienced by processor core 123 as well as an address associated with the data to be fetched into cache 390 in response to the cache miss. Replacement policy logic module 310 may then determine if a data block from the cache partition corresponding to the same data source as where the cache miss data is retrieved from, may be victimized, or if a data block from a different cache partition compared to the cache partition of the data source the cache miss data is retrieved from, may be victimized, so that data are instead evicted from the different cache partition. A "victimized" data block is a block storing data that are evicted and replaced with new data, such as the data retrieved into cache 390 in response to the cache miss. As shown, replacement policy logic module 310 may generally use partition size data 335 from partition size table 330 to complete this operation. Partition size data 335, partition size table 330, and a procedure by which replacement policy logic module 310 determines how to store the retrieved data are described below.

Data source identifier module 320 may be a module configured to determine which of data sources 1-5 is associated with the data retrieved into cache 390 when processor core 123 experiences a cache miss. Various schemes may be used to make such a determination. In the embodiment illustrated in FIG. 3, data source identifier module 320 may include an address pattern matching (APM) table 321 and a data source ID (DSI) table 322.

APM table 321 may be configured to generate a match vector 325 based on the address of the data referenced in cache miss data 315. In some embodiments, APM table 321 matches address patterns in the address of said data, and updates a bit in match vector 325 corresponding to each pattern in the address. For example, a 4-bit match vector 325 can identify whether or not the address in cache miss data 315 matches up to four different address patterns, where each address pattern may be associated with one of data sources 1-5. By way of example, the first address pattern might be defined as all odd pages, the second pattern might be defined as all even pages, the third address pattern might be defined as addresses in a certain address range, e.g., 01 to 10 in some bit positions, and the fourth address pattern might be defined as addresses in another address range, e.g., 11 to 20. Thus, given such pattern definitions, data referenced in cache miss data 315 having an address of 10 (which is an even page and a page in the range 01-10) generates a match vector 325 having the value 0-1-1-0, which represent the first-through-fourth bit positions corresponding to the first-through-fourth address patterns recognized by APM table 321.

It is noted that in embodiments in which APM table 321 is used, any suitable number of address patterns may be defined for match vector 325. Furthermore, in some embodiments, address patterns involving specific address ranges may be used to ensure that certain pages are handled by a memory controller in CMP 100, such as an on-chip DRAM.

DSI table 322 may be configured to efficiently determine which of data sources 1-5 is associated with data referenced in cache miss data 315. In some embodiments, DSI table 322 uses match vector 325 from APM table 321, and can quickly look up the source ID of the data source associated with cache miss data 315. DSI table 322 then provides source ID 326 for indexing partition size table 330.

Partition size table 330 may be configured to look up partition information associated with source ID 326. Generally, each entry in partition size table 330 may include a target size of the partition occupying a particular one of data sources 1-5, the current size of said partition, a miss cost value, and/or other information. The target partition size may be determined by cache partitioning logic module 340 (described below) based on an optimization algorithm. In some embodiments, the optimization algorithm may select partition sizes, e.g., target partition sizes in partition size table 330, based on the miss rate curve for the application running on processor core 123 and on the cost function of the data source that includes the partition of interest. When cache misses are experienced by processor core 123, miss cost may be updated in partition size table 330, for example in some embodiments as a moving average, miss cost data 336 may be provided to cache partitioning logic module 340, and partition size data 335 may be generated by comparing target partition size to current partition size in partition size table 330.

Partition size data 335 may be used by replacement policy logic module 310 to determine whether to: 1) victimize a block from the cache partition corresponding to the same data source as the data referenced in cache miss data 315, or 2) victimize a block from a different cache partition to store the data. Replacement policy logic module 310 may then send a suitable victim block tag (corresponding to a source ID data 316) to cache 390. Specifically, when the target size for the entry of interest in partition size table 330 is less than or equal to the current size of the entry of interest in partition size table 330, the partition associated with said entry may be too large (i.e., overallocated). Consequently, the data referenced in cache miss data 315 may be stored in the same cache partition corresponding to the source ID for the entry of interest. The partition size does not change for the entry, since a block in the same cache partition may be victimized to make room for the newly stored data. Conversely, when the target size in partition size table 330 is greater than the current size in partition size table 330, the partition associated with the entry may be too small (i.e., underallocated). Consequently, the partition may be increased in size by storing the data referenced in cache miss data 315 in the partition corresponding to a different source ID for the entry of interest; the partition size may increase for the entry, since a block in a different cache partition in the different source ID may be victimized to make room for the newly stored data.

Cache partitioning logic module 340 may be configured to determine target sizes for each entry in partition size table 330. Generally, cache partitioning logic module 340 may base the determination on a miss curve profile, such as miss rate curve 210 in FIG. 2A, and miss cost data 336 using an optimization algorithm. In some embodiments, the optimization algorithm may select target partition sizes in partition size table 330 based on the miss cost curve for each partition represented in partition size table 330. In other words, the target partition sizes may be based on the miss rate curve for the application running on processor 321 and on the cost functions of the various data sources that include a partition allocated to processor core 123. Generally, a suitable miss rate curve can be generated by cache 390 or other module that has access to cache operations. Newly determined target sizes for entries in partition size table 330 may be transmitted via target size data 345. In some embodiments, cache partitioning logic module 340 may determine new target sizes for entries in partition size table 330 on a repeated basis, such as every 10,000 or 100,000 cache misses or clock cycles. This is because the optimal values for the target sizes in partition size table 330 may typically not change significantly over short periods of time.

Cache partitioning system 300 can be configured to accommodate the different miss cost curves of data sources with respect to each processor core 120 in CMP 100, since partition size table 330 and cache partitioning logic module 340 can be programmed differently for each processor core 120. In this way, cache memory may be partitioned for a particular processor core 120 based on differences in latency or energy consumption of the various data sources. Furthermore, partition size table 330 and cache partitioning logic module 340 may be updated during operation to reflect the different usages of or for any particular application being run on a processor core 120.

Figure 4:
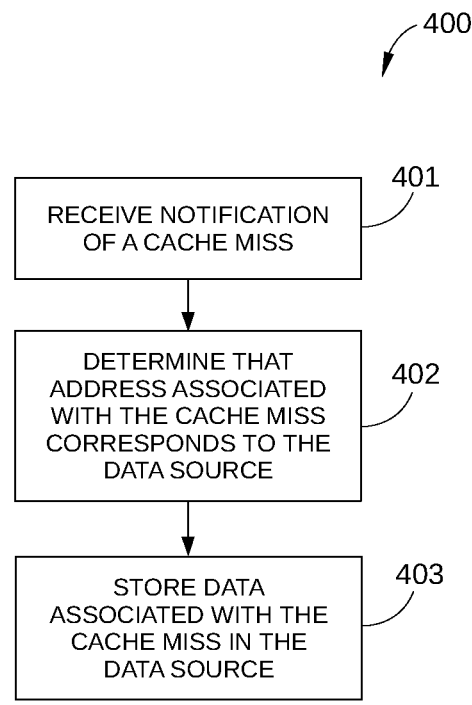
FIG. 4 sets forth a flowchart of an example method to update a cache in a multi-core processor.

FIG. 4 sets forth a flowchart summarizing an example method 400 for updating a cache in a multi-core processor, according to an embodiment of the disclosure. Method 400 may include one or more operations, functions, or actions as illustrated by one or more of blocks 401, 402, and/or 403. Although the blocks are illustrated in a sequential order, these blocks may also be performed in parallel, and/or in a different order than those described herein. Also, the various blocks may be combined into fewer blocks, divided into additional blocks, and/or eliminated based upon the particular implementation. Additional blocks representing other operations, functions, or actions may be provided. Although method 400 is described in conjunction with CMP 100 of FIGS. 1-3, any suitable chip multiprocessor configured to perform method 400 is within the scope of this disclosure.

Method 400 may begin in block 401 "receive cache miss." Block 401 may be followed by block 402 "determine that an address associated with the cache miss corresponds to a data source," and block 402 may be followed by block 403 "store data associated with the cache miss in the data source."

In block 401, a cache partitioning system associated with CMP 100, such as cache partitioning system 300, receives a notification of a cache miss from a processor core 120. The cache miss may be associated with a process running on processor core 120, such as an execution thread or application.

In block 402, cache partitioning system 300 determines that an address associated with the cache miss referenced in block 401 corresponds to a specific data source of CMP 100. It is noted that CMP 100 may include multiple data sources and/or memory controllers, each of which can be used for portions of a cache memory associated with the processor core 120 that experienced the cache miss. Consequently, cache partitioning system 300 may be configured to programmably allocate portions of data sources 1-5 of CMP 100 to that processor core 120 based on latency and/or energy consumption associated with each data source.

In block 403, cache partitioning system 300 stores data associated with the cache miss referenced in block 401 in the data source that is determined in block 402 to be associated with the cache miss. When the current size of the cache partition on that data source is equal to or greater than a target size of the cache partition (as indicated in partition size table 330), data in the cache partition may be replaced with data associated with the cache miss, so that the size of the cache partition stays the same. When the current size of the cache partition on that data source is less than a target size of the cache partition, data in a different cache partition on the data source may be replaced with data associated with the cache miss, so that the size of the cache partition may be increased in size at the expense of the different cache partition on the data source. It is noted that the different cache partition on the data source may not be associated with the process referenced in block 401 that is running on the processor core 120. It is further noted that the target size of the cache partition referenced in block 403 may be based on a cost function of the cache partition and a miss rate of the process running on the single core.

Figure 5:
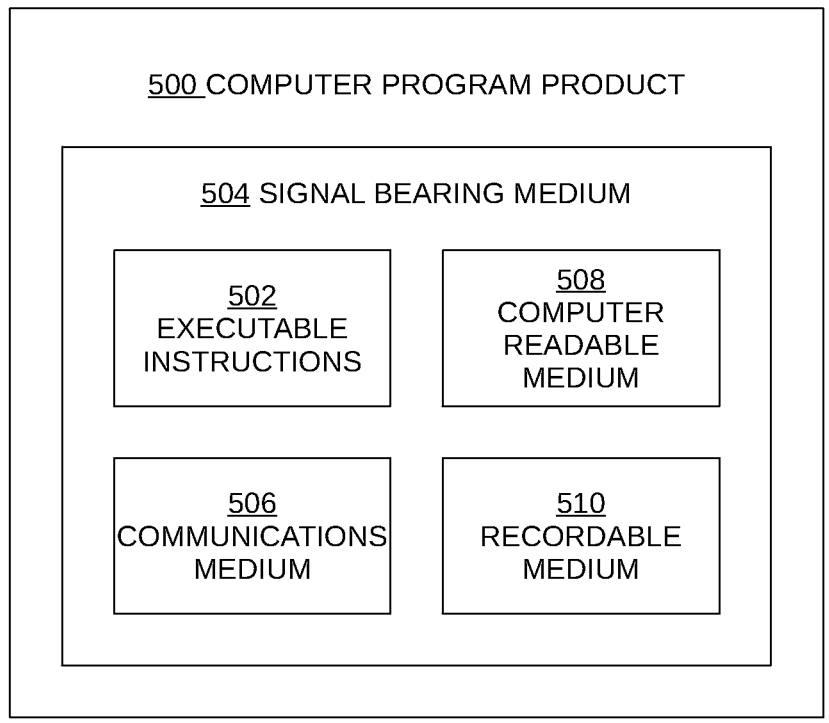
FIG. 5 is a block diagram of an illustrative embodiment of a computer program product to implement a method for updating a cache in a multi-core processor.

FIG. 5 is a block diagram of an illustrative embodiment of a computer program product 500 to implement a method for updating a cache in a multi-core processor. Computer program product 500 may include a signal bearing medium 504. Signal bearing medium 504 may include one or more sets of executable instructions 502 that, when executed by, for example, a processor of a computing device, may provide at least the functionality described above with respect to FIGS. 1-4.

In some implementations, signal bearing medium 504 may encompass a non-transitory computer readable medium 508, such as, but not limited to, a hard disk drive, a Compact Disc (CD), a Digital Video Disk (DVD), a digital tape, memory, etc. In some implementations, signal bearing medium 504 may encompass a recordable medium 510, such as, but not limited to, memory, read/write (R/W) CDs, R/W DVDs, etc. In some implementations, signal bearing medium 504 may encompass a communications medium 506, such as, but not limited to, a digital and/or an analog communication medium (e.g., a fiber optic cable, a waveguide, a wired communications link, a wireless communication link, etc.). Computer program product 500 may be recorded on non-transitory computer readable medium 508 or another similar recordable medium 510.

Figure 6:
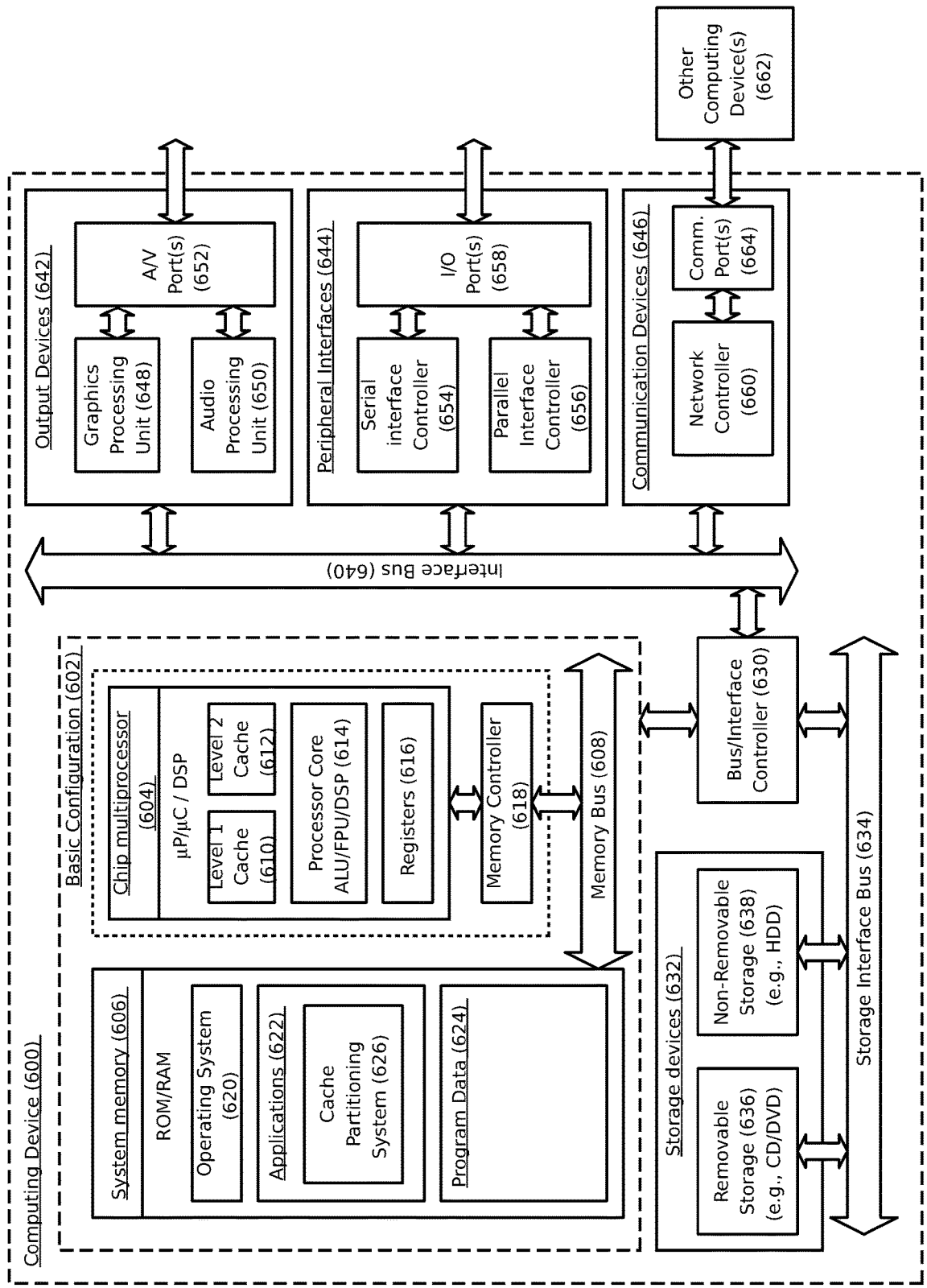
FIG. 6 is a block diagram illustrating an example computing device, all arranged in accordance with at least some embodiments of the present disclosure.

FIG. 6 is a block diagram illustrating an example computing device 600, according to at least some embodiments of the present disclosure. In a very basic configuration 602, computing device 600 typically includes one or more chip multiprocessors 604 and a system memory 606. A memory bus 608 may be used for communicating between processor 604 and system memory 606.

Chip multiprocessor 604 may be substantially similar in configuration and operation to CMP 100 in FIG. 1. Depending on the desired configuration, chip multiprocessor 604 may be of any type including but not limited to a microprocessor (pP), a microcontroller (pC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a cache partitioning system 626, similar to cache partitioning system 300 of FIG. 3, arranged to perform at least the functions as those described with respect to method 400 of FIG. 4. Program data 624 may be useful for operation with cache partitioning system 626 as is described herein. In some embodiments, application 622 may be arranged to operate with program data 624 on operating system 620. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link, such as, without limitation, optical fiber, Long Term Evolution (LTE), 3G, WiMax, via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

As described herein, embodiments of the present disclosure enable cache partitioning for a processor core in a chip multiprocessor that can optimize or otherwise improve latency or energy costs associated with cache misses. The cache partitioning may be based on the differences in latencies or energies of multiple data sources and may facilitate efficient operation of a single application or thread running on a single processor core of a chip multiprocessor. Embodiments of the cache partitioning scheme described herein can provide improved performance or energy efficiency of a chip multiprocessor. Such performance and energy benefits may increase with larger core-count chip multiprocessors, since the larger variation between data sources of such multiprocessors enhances the benefits of embodiments of the disclosure. Application of NTD to memory controllers in chip multiprocessors can further enhance the advantages of the disclosure.

There is little distinction left between hardware and software implementations of embodiments of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to partition a cache of a processor core of a multi-core processor, the method comprising:
   determining, for each data source of a plurality of data sources, at least one of a latency cost or an energy cost to employ the data source to satisfy a cache miss experienced by the processor core of the multi-core processor; and
   partitioning the cache of the processor core into a plurality of cache partitions based on the at least one of the latency cost or the energy cost, wherein each cache partition of the plurality of cache partitions corresponds to a respective data source of the plurality of data sources.

2. The method of claim 1, wherein determining the at least one of the latency cost or the energy cost comprises generating a miss cost curve for each data source of the plurality of data sources.

3. The method of claim 2, wherein generating the miss cost curve for each data source comprises multiplying a cost function for the data source by a miss rate curve of an application or a thread that runs on the processor core.

4. The method of claim 3, wherein the miss rate curve of the application or the thread is related to a size of the cache.

5. The method of claim 2, wherein the miss cost curve for each data source is related to a plurality of attributes that includes an access latency associated with a memory associated with the data source, an operating frequency of a memory controller associated with the data source, and a location of the data source relative to the processor core.

6. The method of claim 1, wherein partitioning the cache into the plurality of cache partitions includes selecting sizes, of the cache partitions that correspond to respective data sources, to reduce a total cost of cache misses in terms of latency or energy.

7. A non-transitory computer readable storage medium having stored therein computer-executable instructions, wherein the instructions, in response to execution by a computer, cause the computer to perform or control performance of operations to partition a cache of a processor core of a multi-core processor, wherein the operations comprise:
   determine, for each data source of a plurality of data sources, at least one of a latency cost or an energy cost to employ the data source to satisfy a cache miss experienced by the processor core of the multi-core processor; and
   partition the cache of the processor core into a plurality of cache partitions based on the at least one of the latency cost or the energy cost, wherein each cache partition of the plurality of cache partitions corresponds to a respective data source of the plurality of data sources.

8. The non-transitory computer readable storage medium of claim 7, wherein the operation to determine the at least one of the latency cost or the energy cost includes an operation to generate a miss cost curve for each data source of the plurality of data sources.

9. The non-transitory computer readable storage medium of claim 8, wherein the operation to generate the miss cost curve for each data source comprises an operation to multiply a cost function for the data source by a miss rate curve of an application or a thread that runs on the processor core.

10. The non-transitory computer readable storage medium of claim 9, wherein the miss rate curve of the application or the thread is related to a size of the cache.

11. The non-transitory computer readable storage medium of claim 8, wherein the miss cost curve for each data source is related to a plurality of attributes that includes an access latency associated with a memory associated with the data source, an operating frequency of a memory controller associated with the data source, and a location of the data source relative to the processor core.

12. The non-transitory computer readable storage medium of claim 7, wherein the operation to partition the cache into the plurality of cache partitions includes an operation to select sizes, of the cache partitions that correspond to respective data sources, to reduce a total cost of cache misses in terms of latency or energy.

13. A multi-core processor, comprising:
   a processor core;
   a cache of the processor core; and
   a control unit coupled to the processor core and to the cache, wherein the control unit is operable to:
      determine, for each data source of a plurality of data sources, at least one of a latency cost or an energy cost to employ the data source to satisfy a cache miss experienced by the processor core; and
      partition the cache of the processor core into a plurality of cache partitions based on the at least one of the latency cost or the energy cost, wherein each cache partition of the plurality of cache partitions corresponds to a respective data source of the plurality of data sources.

14. The multi-core processor of claim 13, wherein to determine the at least one of the latency cost or the energy cost, the control unit is operable to generate a miss cost curve for each data source of the plurality of data sources.

15. The multi-core processor of claim 14, wherein to generate the miss cost curve for each data source, the control unit is operable to multiply a cost function for the data source by a miss rate curve of an application or a thread that runs on the processor core.

16. The multi-core processor of claim 15, wherein the miss rate curve of the application or the thread is related to a size of the cache.

17. The multi-core processor of claim 14, wherein the miss cost curve for each data source is related to a plurality of attributes that includes an access latency associated with a memory associated with the data source, an operating frequency of a memory controller associated with the data source, and a location of the data source relative to the processor core.

18. The multi-core processor of claim 13, wherein to partition the cache into the plurality of cache partitions, the control unit is operable to select sizes, of the cache partitions that correspond to respective data sources, to reduce a total cost of cache misses in terms of latency or energy.

* * * * *